(12) United States Patent
Guertler

(10) Patent No.: US 7,270,206 B2
(45) Date of Patent: Sep. 18, 2007

(54) AERODYNAMICALLY CONSTRUCTED COVERING PART FOR THE UNDERSIDE OF A MOTOR VEHICLE

(75) Inventor: Tom Guertler, Gerlingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 234 days.

(21) Appl. No.: 10/937,508

(22) Filed: Sep. 10, 2004

(65) Prior Publication Data

US 2005/0051372 A1    Mar. 10, 2005

(30) Foreign Application Priority Data

Sep. 10, 2003  (DE)  ................ 103 41 642

(51) Int. Cl.
    *B60K 11/00*    (2006.01)
    *B62D 27/00*    (2006.01)
    *B62D 25/20*    (2006.01)
(52) U.S. Cl. ............. 180/68.1; 180/68.2; 180/68.3; 180/69.1; 180/89.2; 180/309; 296/38
(58) Field of Classification Search ........... 180/68.1, 180/68.2, 68.3, 69.1, 89.2, 309; 296/38
    See application file for complete search history.

(56) References Cited

U.S. PATENT DOCUMENTS 2,194,394 A * 3/1940 Klavik ............... 180/68.1
4,492,282 A * 1/1985 Appelblatt et al. ...... 180/68.1
4,772,060 A * 9/1988 Kretschmer ........... 296/180.1
4,850,444 A * 7/1989 Bojanowski et al. .... 180/68.1
5,025,878 A * 6/1991 Preiss ................ 180/68.1
2003/0168267 A1 9/2003 Borroni-Bird et al.

FOREIGN PATENT DOCUMENTS

| DE | AS 1 286 917 | 1/1969 |
|----|----|----|
| DE | 36 17 538 | 11/1987 |
| DE | 44 29 924 | 3/1995 |

* cited by examiner

*Primary Examiner*—Christopher P. Ellis
*Assistant Examiner*—John R. Olszewski
(74) *Attorney, Agent, or Firm*—Crowell & Moring LLP

(57) ABSTRACT

At least one vent hole is provided on an aerodynamically constructed covering part for the underside of a motor vehicle. A partial flow of the cold fresh air flows through the vent hole between the covering part and the roadway and is guided to a space which is situated above and accommodates assemblies and/or chassis parts. At least one suction device is provided on the covering part for carrying away the heated air situated in the space disposed above in the direction of the roadway.

3 Claims, 2 Drawing Sheets

AERODYNAMICALLY CONSTRUCTED COVERING PART FOR THE UNDERSIDE OF A MOTOR VEHICLE

BACKGROUND AND SUMMARY OF THE INVENTION

This application claims the priority of German Application No.: 103 41 642.0 filed Sep. 10, 2003, the disclosure of which is expressly incorporated by reference herein.

The invention relates to an aerodynamically constructed covering part for the underside of a motor vehicle, particularly a passenger car. The covering part has a vent hole through which a partial flow of the cold fresh air flowing through between the covering part and the roadway during the driving operation is guided to a space which is situated above and accommodates assemblies and/or chassis parts, such as the engine compartment and/or transmission space or the like. The partial flow cools the assemblies and/or chassis parts situated there.

Increasingly, the aerodynamic optimization of vehicles takes place at the underside of the vehicle. Here, it is endeavored to implement an underbody having a smooth-surface covering. However, these coverings have the disadvantage that covered areas heat up more intensely. The reason is the insufficient exchange between, on one hand, heated air in the engine compartment and transmission space and, on the other hand, fresh cooling air. The known vent holes permit the targeted feeding of cold fresh air.

A problem arises, however, when already heated outgoing air mixes with the fresh air provided for the cooling, or when incoming and outgoing air conduction devices have a faulty design or do not exist. Furthermore, the aerodynamic advantages of a smooth underbody are considerably impaired by conventional venting concepts.

From German Patent Document DE-AS 1 286 917, a passenger car is known which is equipped with an aerodynamically constructed covering part on its underside. A grille in the form of several slots is provided below the engine on the covering part for venting the engine compartment.

In this arrangement, during the driving operation, a partial flow of the cold fresh air guided through between the covering part and the roadway is conducted through the slots to the engine situated above.

However, German Patent Document DE-AS 1 286 917 does not contain any information as to how the air heated by the engine is discharged from the engine compartment.

It is an object of the invention to further develop an aerodynamically constructed covering part for the underside of a motor vehicle according to the initially mentioned type such that, when the aerodynamic potential of a smooth underbody is utilized, simultaneously the air flowing through the engine compartment and the transmission space is fed and carried away in a targeted and therefore efficient manner.

According to certain preferred embodiments of the invention, this object is achieved by providing an aerodynamically constructed covering part for the underside of a motor vehicle, particularly a passenger car. At least one vent hole is provided on the covering part, through which a partial flow of cold fresh air flowing through between the covering part and the roadway during the driving operation is guided to a space which is situated above and accommodates assemblies and/or chassis parts, such as the engine compartment and/or transmission space or the like. The partial flow cools the assemblies and/or chassis parts situated there, and at least one suction device is provided on the covering part for carrying away the heated air situated in the space disposed above in the direction of the roadway. The at least one suction device being arranged at a distance from the vent hole.

Other advantageous features of Preferred embodiments of the invention are described herein and the claims.

Important advantages achieved by means of the invention are that, as a result of the arrangement of at least one suction device on the covering part, the air circulating through the engine compartment and transmission space is divided in a defined manner into a cooling incoming-air conduction and an outgoing-air conduction carrying away the heated air. As a result of the spatially offset arrangement of the at least one suction device with respect to the vent hole, it is achieved that only cold fresh air is fed to the engine compartment and transmission space, whereas the heated air flows out laterally beside the vent hole and then flows along the underside of the vehicle and is carried away toward the rear.

The suction effect is created in certain preferred embodiments of the invention by aerodynamically optimized suction gills, which form a vacuum zone at the covering part. Viewed in the longitudinal direction of the vehicle, the transversely extending suction gills are arranged in a spaced manner behind one another and are set against the air flow guided through between the roadway and the covering part. The suction gills extend from the covering part downward in the direction of the roadway and have a blade-shaped cross-section. The shape and the position of the suction gills are adapted to the respective cooling task and have the advantage that the aerodynamic coefficients are impaired only insignificantly.

An embodiment of the invention is illustrated in the drawing and will be explained in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
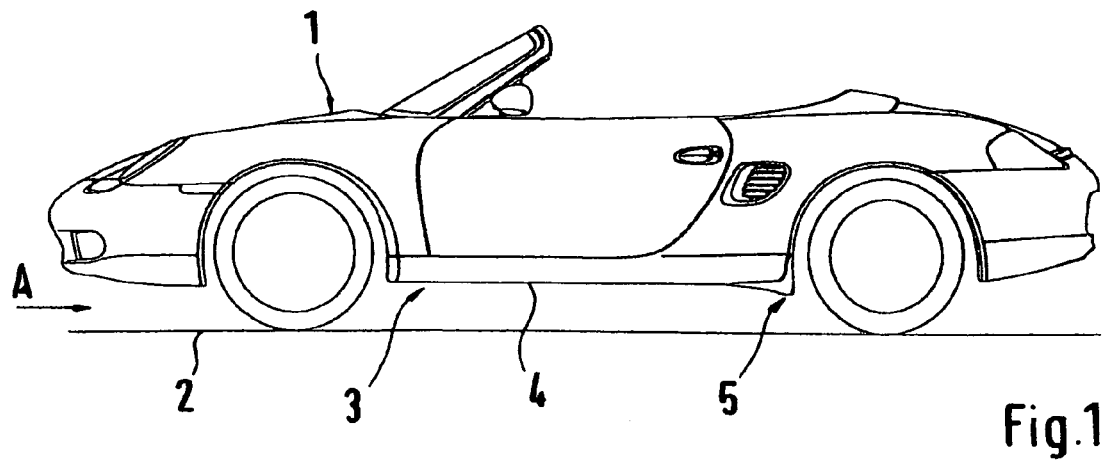
FIG. 1 is a lateral view of a passenger car with an aerodynamically constructed covering part extending adjacent to the roadway, constructed according to a preferred embodiment of the invention.

FIG. 1 illustrates a motor vehicle 1 formed by a passenger car, whose underside 3 extending adjacent to a roadway 2 is provided with an aerodynamically constructed covering part 4. The covering part 4, which is preferably made of a plastic material or of a light metal, has a smooth surface in the direction of the roadway 2 and is held in position in a known manner on the vehicle body situated above it. It preferably covers the entire vehicle underside and may be constructed in one or more parts. The illustrated motor vehicle 1 is equipped with a mid-engine or a rear engine.

A space 6 which accommodates assemblies and/or chassis parts extends in the rear area 5 of the motor vehicle 1 above the covering part 4. In the embodiment shown, an engine 7 and an adjoining transmission 8 are arranged in the space 6.

So that, in the case of a complete underbody covering, certain assemblies and/or chassis parts situated above the covering part are sufficiently cooled in the driving operation, at least one vent hole 9 is arranged on the covering part 4, through which vent hole 9 a partial flow B of the cold fresh air A guided through between the roadway 2 and the covering part 4 is branched off upward into the space 6. In the embodiment shown, the vent hole 9 extends on both sides of a longitudinal center plane C-C of the vehicle and has a width D.

Figure 2:
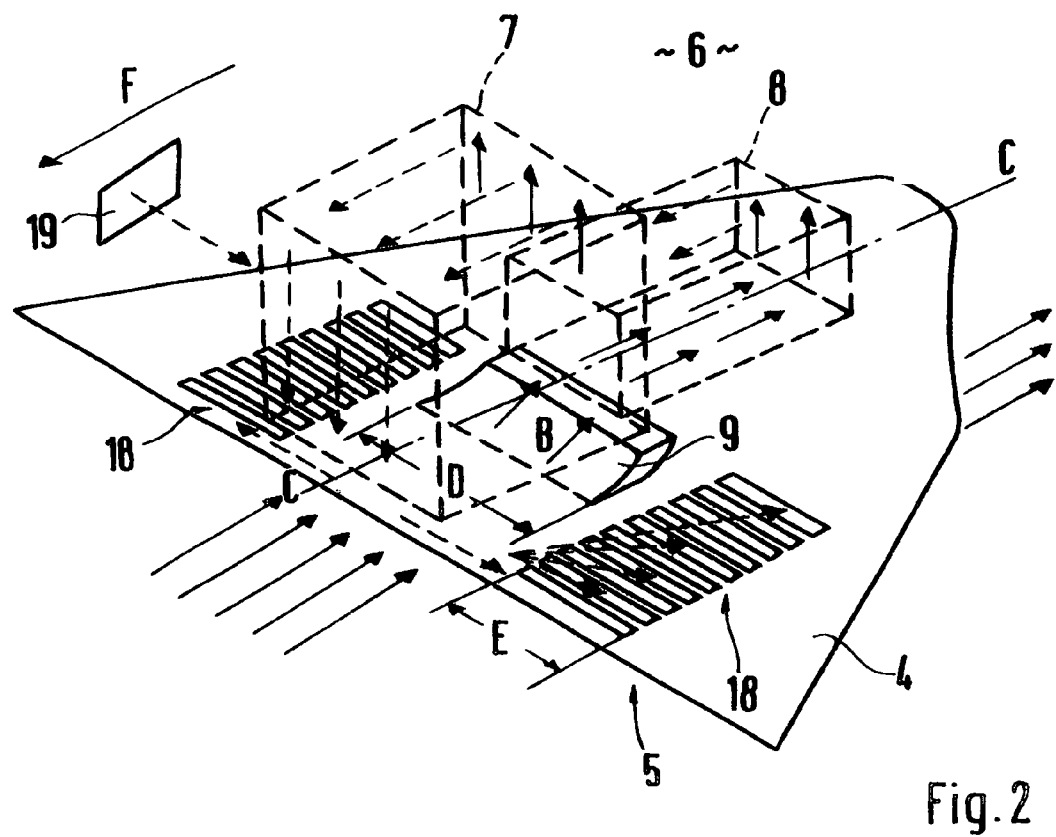
FIG. 2 is a perspective view diagonally from the front of a partial area of the covering part with the air suction according to the invention for the area situated above the covering part.
Figure 3:
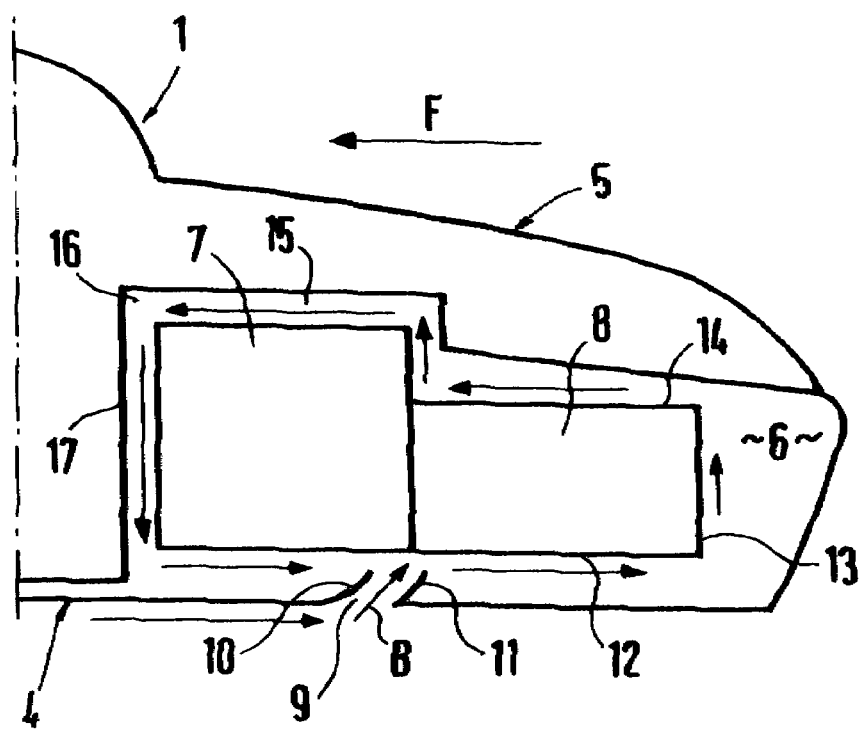
FIG. 3 is a vertical sectional view of the covering part with the vent hole.

At the forward and rearward end of the vent hole 9, which is approximately rectangular in the top view, upward-oriented curved guide sections 10, 11 are constructed on the covering part 4 or on an attachment part, by means of which guide sections 10, 11 the partial flow B of the cold fresh air A is guided upward to the underside of the transmission 8. The partial air flow B flows along the transmission underside 12, cools this surface in the process, and heats up as a result. The heated air flows upward at the transmission end 13 and flows toward the front on the top side 14 of the transmission and on the top side 15 of the engine. At the forward upper end 16 of the engine 7, the air is deflected again and flows between the engine 7 and an adjoining, transversely extending upright partition wall 17 in the downward direction (FIGS. 2 and 3).

By means of the at least one suction device 18 according to the invention provided on the covering part 4, the air on the forward lower end of the engine 7 is deflected in the direction of the suction device 18. In this case, the air flows past the outlet manifolds of the exhaust system and heats up intensively. As a result of the suction effect of the suction device 18, the hot air is now transported from the engine compartment 6 to the outside, flows along the underside of the vehicle and is carried away toward the rear.

If cooling fresh air is additionally fed to the engine compartment 6 through another vehicle-body-side vent hole 19, the cooling air follows the illustrated flow direction and intensifies the cooling effect around the engine 7. In the embodiment shown, the transmission 8 is arranged behind the engine 7. However, the function is ensured also when the arrangement is reversed.

Figure 4:
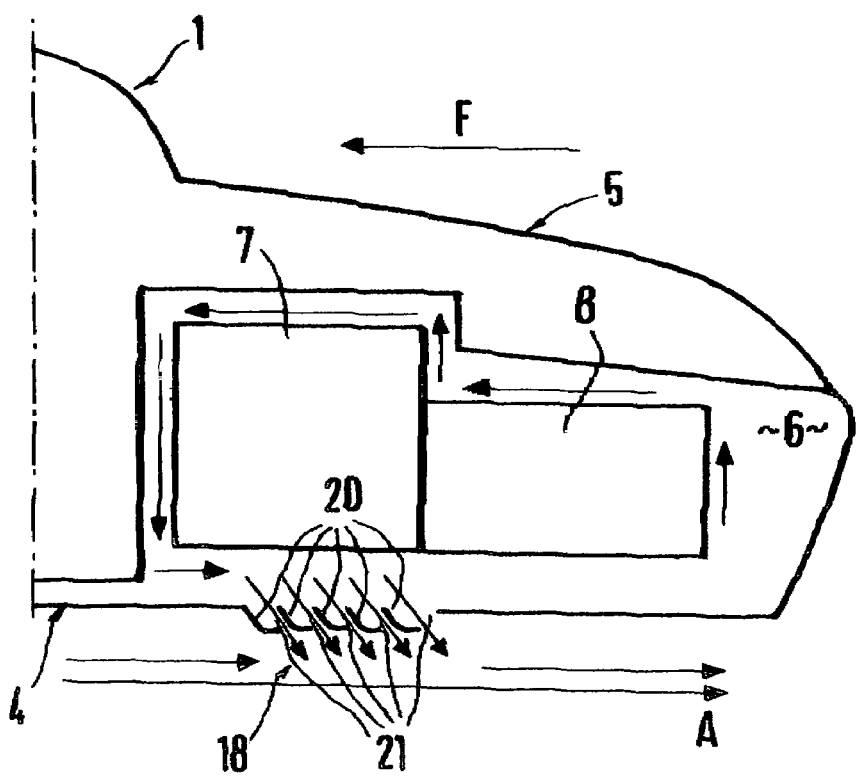
FIG. 4 is a vertical sectional view of the covering part with the suction device.

According to the invention, the at least one suction device 18 provided at the covering part 4 is formed by several suction gills 20 which, viewed in the longitudinal direction of the vehicle, are arranged behind one another. The suction gills 20 are set against the air flow A flowing through between the covering part 4 and the roadway 2 and extend from the covering part 4 slightly downward in the direction of the roadway 2 (FIG. 4). Transversely extending air passage openings 21 extend between the individual suction gills 20. In the embodiment shown, two laterally arranged suction devices 18 are provided which extend on both sides of the central vent hole 9 and each have a width E. However, there is also the possibility of arranging the suction device 18 in a central area and to arrange the vent holes 9 in a laterally exterior area of the covering part 4. In the embodiment shown, viewed in the driving direction F, the forward end of the suction device 18 is situated in front of the vent hole 9, whereas the rearward end of the suction devices 18 approximately coincides with the rearward end of the vent hole. However, this situation may also be different.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Aerodynamically constructed covering part for covering an entire underside of a vehicle, comprising at least one central vent hole in the covering part for guiding a partial flow of cold fresh air flowing through between the covering part and a roadway during a driving operation to a space surrounding at least one of an engine compartment and a transmission space for cooling components therein, and aerodynamically optimized and transversely extending suction gills provided on the covering part and defining vacuum zones for carrying away the heated air situated in the space disposed above downwardly toward the roadway, the suction gills being spaced laterally from the vent hole, wherein, as viewed in a longitudinal direction of the vehicle, said suction gills are arranged behind one another with an air passage opening defined between each two adjacent suction gills so as to be set against the flowing cold fresh air.

2. Covering part according to claim 1, wherein the suction gills and the covering part are one piece.

3. Covering part according to claim 1, wherein the suction gills are constructed on a separate attachment part that is fastened to the covering part.

\* \* \* \* \*